United States Patent
Persici et al.

(10) Patent No.: US 10,825,284 B2
(45) Date of Patent: Nov. 3, 2020

(54) AUTOMATIC DISPENSER OF PORTABLE TERMINALS

(71) Applicant: Datalogic IP Tech S.r.l., Bologna (IT)

(72) Inventors: William Persici, Bologna (IT); Andrea Belli, Bologna (IT); Marco D'Ulisse, Bologna (IT)

(73) Assignee: DATALOGIC IP TECH S.R.L., Lippo di Calderara di Reno (BO) (IT)

(*) Notice: Subject to any disclaimer, the term of this patent is extended or adjusted under 35 U.S.C. 154(b) by 155 days.

(21) Appl. No.: 16/065,475

(22) PCT Filed: Dec. 24, 2015

(86) PCT No.: PCT/IT2015/000319
§ 371 (c)(1),
(2) Date: Jun. 22, 2018

(87) PCT Pub. No.: WO2017/109800
PCT Pub. Date: Jun. 29, 2017

(65) Prior Publication Data
US 2019/0005761 A1   Jan. 3, 2019

(51) Int. Cl.
| | | |
|---|---|---|
| G06K 7/10 | (2006.01) | |
| G07F 11/62 | (2006.01) | |
| G07F 9/10 | (2006.01) | |
| G07F 11/54 | (2006.01) | |
| G07F 17/00 | (2006.01) | |
| G07G 1/00 | (2006.01) | |
| G06Q 20/18 | (2012.01) | |

(52) U.S. Cl.
CPC ............ G07F 11/62 (2013.01); G06Q 20/18 (2013.01); G07F 9/105 (2013.01); G07F 11/54 (2013.01);
(Continued)

(58) Field of Classification Search
CPC ....... G07G 1/0081; G07G 1/14; H02J 7/0044; H02J 50/20; H02J 7/025; H02J 7/0027;
(Continued)

(56) References Cited

U.S. PATENT DOCUMENTS 4,831,841 A * 5/1989 Falk ...................... A47F 3/0408
                                                            62/255
4,927,051 A * 5/1990 Falk ........................ G07F 11/54
                                                           194/350
(Continued)

FOREIGN PATENT DOCUMENTS

| EP | 1076213 A2 | 2/2001 |
| FR | 772333 A | 10/1934 |
| JP | 3067677 B2 | 7/2000 |

OTHER PUBLICATIONS

Translation for FR772333A, all pages pertinent.*

Primary Examiner — Thien T Mai
(74) Attorney, Agent, or Firm — Stoel Rives LLP (57) ABSTRACT

Automatic dispenser (10) of portable terminals (100), comprising a vertical body (11) having a fully closed storage area (20) including a plurality of compartments (50) for storing a corresponding plurality of portable terminals (100) to be taken by authorised users. At least one access door (25) is arranged on said vertical body (11) at said storage area (20) to provide for a selective access within the storage area (20). The dispenser (10) comprises a wireless charging unit arranged within said storage area (20) at each compartment (50) and an air conditioning system (200) configured to control temperature and humidity of each compartment (50).

20 Claims, 4 Drawing Sheets

(52) U.S. Cl.
CPC ....... *G07F 17/0042* (2013.01); *G07G 1/0081* (2013.01)

(58) Field of Classification Search
CPC ........ H02J 50/40; H02J 13/0075; H02J 50/10; H02J 7/0013; H02J 7/0045; H04B 5/0037; H04B 5/0081; H04B 5/0031; G06Q 20/127; G06Q 20/18; G07F 15/003; G07F 17/0014; G07F 11/62; G07F 17/0042; G07F 9/105; G07F 11/54; H04M 19/08; A61L 2/10
See application file for complete search history.

(56) References Cited

U.S. PATENT DOCUMENTS

| | | | |
|---|---|---|---|
| 5,744,933 A * | 4/1998 | Inoue | G06Q 20/127 320/110 |
| 5,971,205 A * | 10/1999 | Michaels | G07F 9/105 221/135 |
| 6,386,449 B1 | 5/2002 | Signoretto | |
| 6,505,780 B1 * | 1/2003 | Yassin | B60R 25/2081 235/384 |
| 8,337,770 B2 | 12/2012 | Wind | |
| 8,606,981 B2 | 12/2013 | Engelhardt et al. | |
| 2002/0158130 A1 | 10/2002 | Pellaumail et al. | |
| 2010/0237100 A1 * | 9/2010 | Broussard | B67D 1/0857 222/146.6 |
| 2014/0007594 A1 | 1/2014 | Lofy et al. | |
| 2014/0368156 A1 | 12/2014 | Aloe | |
| 2015/0019008 A1 | 1/2015 | Van Ooyen et al. | |
| 2015/0084584 A1 | 3/2015 | Monks et al. | |
| 2015/0115173 A1 * | 4/2015 | Kim | H02J 7/0013 250/455.11 |
| 2015/0326060 A1 * | 11/2015 | Young | H02J 7/0077 320/108 |
| 2016/0204618 A1 * | 7/2016 | Samuelsson | H02J 5/005 307/104 |
| 2019/0028149 A1 * | 1/2019 | Pifferi | H02J 7/025 |

* cited by examiner

AUTOMATIC DISPENSER OF PORTABLE TERMINALS

The present invention relates to an automatic dispenser of portable terminals.

Preferably, the automatic dispenser of the invention is used in a store or shopping centre to provide authorised users or customers with portable terminals in order to carry out self-shopping operations.

Throughout the present description and in the following claims, the expression "portable terminals" is used to indicate electronic and/or optoelectronic devices which are configured to be handled by an user for acquiring product data/information. We refer, for example, to optical code readers, palmtop computers, laptop computers, PDAs, tablet computers, cell phones, portable measuring equipment and more generally to portable devices that are capable of being connected within wireless networks through a suitable radio frequency transmission/reception device or the like.

Preferably, the portable terminals used in the automatic dispenser of the invention are devices capable of reading optical codes printed on products on sale in a store or shopping centre.

Throughout the present description and in the following claims, the expression "self-shopping operations" is used to indicate shopping operations wherein the customer of the shopping centre, after having been authorised, takes a portable terminal from a dispenser specifically provided within the shopping centre, chooses the products to be bought from the shelves of the shopping centre, reads the optical codes of the products through the portable terminal before putting the products into the trolley or basket and then goes to a checkout counter to finally compute the total amount to be paid.

An automatic dispenser of portable terminals for carrying out self-shopping operations in a shopping centre is disclosed in U.S. Pat. No. 6,386,449. This dispenser comprises a container including a plurality of compartments for a corresponding plurality of portable terminals suitable for both reading the bar codes printed on the products and storing the product information contained in the bar codes. The container further comprises means for identifying the customers enabled to take the portable terminals from the dispenser and means for moving the compartments within the container so as to selectively face one of them to at least one access door. The movement of the compartments is driven by a control unit, which also drives the opening of the door once the customer has been authorised. Each compartment is provided with connectors adapted to co-operate with respective connectors provided onto the terminal housed therein for charging the battery of the terminal.

The Applicant observed that because of the provision of physical connectors both in the compartments and in the terminals, the dispenser disclosed in the abovementioned prior art document is configured to be used only with terminals having, at least at the portion thereof where the connectors are provided, a shape which closely matches the shape of the portion of the compartments where the corresponding connectors are provided. Indeed, a tight and accurate mechanical mutual coupling between compartments and terminals needs to be achieved in order to allow the battery of the terminals to be charged.

The Applicant observed that it would have been advisable not to have any physical connectors in the compartments so as not to be bound to a specific design of the terminals and compartments as well as to make easier the housing of the terminals in the compartments.

The Applicant also observed that in order to optimize and/or improve both the charging/recharging operation and the terminal battery capacity it would have been advisable to create within the dispenser a temperature controlled environment. Indeed, the Applicant realised that keeping the temperature of the portable terminals within a predetermined range of values during the battery charging/recharging stage provides for reduced battery charging/recharging time and longer battery working time.

The Applicant also observed that for hygiene reasons it would have been advisable to maintain the humidity within the dispenser to low values (preferably lower than 10%), so as to somehow sterilize the portable terminals after having been used by a customer and before being used by another customer. Indeed, the Applicant realised that the humidity possibly generated onto the portable terminals from the hand of the users can long-term generate undesired bacterium and contaminants (for example mould or dewy) onto the portable terminals.

The problem at the basis of the present invention is to provide for an automatic dispenser in order to achieve the abovementioned objectives.

The present invention relates to an automatic dispenser of portable terminals, comprising:
  a vertical body having a fully closed storage area including a plurality of compartments for storing a corresponding plurality of portable terminals to be taken by authorised users;
  at least one access door arranged on said vertical body at said storage area and providing for a selective access within the storage area;
  a wireless charging unit arranged within said storage area at each compartment of said plurality of compartments;
  an air conditioning system configured to control temperature and humidity of each compartment of said plurality of compartments.

Advantageously, the provision of wireless charging units within the dispenser of the invention allows not to provide physical connectors in the compartments, so as not to have strict constraints in the design of the compartments and terminals and to make easy the housing of the terminals in the compartments. Indeed, portable terminals with different shapes can be placed in the compartments, with no need to take care about any accurate mechanical couplings between dedicated wired connectors in the compartments and in the portable terminals. This allows removing the problems connected to false or not correct connection as well to ageing of the connectors. This also allows the owner of the shopping centre for example to maintain the same compartments even in case of restyling of the portable terminals, so that old and new portable terminals can be used together. An analogue advantage is obtained in case the owner of the shopping centre provides for differently shaped versions of portable terminals, for example handheld versions or gun-shaped versions, and wishes all these versions to be used to let the customer the choice of selecting its preferred one.

More advantageously, the provision of an air conditioning system which creates at each compartment a temperature controlled environment avoids overheating of the portable terminal battery during the charging/recharging stage thereof. According to the Applicant, this allows optimizing and/or improving both the battery charging/recharging operation and the battery capacity.

Indeed, the Applicant realised that keeping the battery temperature low as well as charging/recharging the battery at low temperature considerably reduces the battery ageing. Moreover, considering that for safety reasons the batteries need to be charged/recharged in a specific temperature range and that during the charging/recharging time the temperature of the battery raises because of the power losses, the provision of a temperature controlled environment within the dispenser avoids the charging/recharging operation to be periodically stopped and resumed in order to allow the battery temperature to be maintained with the desired temperature range. This implies a reduced charging/recharging time. Furthermore, being the temperature controlled less efficient charging systems can be, with advantages in terms of costs, as well as higher charging current can be used because the heat generated by the power losses is balanced by the cooling action of the air conditioning system. If higher charging currents are used, bigger batteries can be charged in a shorter time, which implies an increase of the battery capacity and a longer battery working time. In addition, using higher charging currents makes the portable terminals more quickly available because the charging time between two following customers using the same portable terminal is shortened. This leads to the possibility to reduce the number of portable terminals to be bought by the owner of the shopping centre.

Advantageously, in the dispenser of the invention the air conditioning system, in addition to control the temperature at each compartment, also controls the humidity at each compartment to avoid any excess of humidity over the portable terminals. The Applicant indeed realized that the cooled air generated by the air conditioning system itself could generate un undesired excess of humidity over the portable terminals, which could cause formation of bacterium or even mould thereon. Humidity on the portable terminals can be also generated by the hands of the users. By controlling the humidity a sort of sterilization of the portable terminals is thus obtained, with advantages to the user's wealth.

The Applicant further realised that using a vertically fashioned housing body allows accommodation of a huge number of portable terminals over a reduced occupied area on the floor and provides the owner of the shopping centre with a huge surface in front of the customers to make marketing advertising. This advertising can be realised for example by affixing on the vertical body printed advertising posters or through multimedia messages appearing on screens arranged on the vertical body.

Moreover, the accommodation of the portable terminals in a closed area makes portable terminals completely unreachable to unauthorised users, even in case of black-out or malfunctioning. This allows a secure storing of the portable terminals, with no need of providing safety lock systems at each compartment.

Furthermore, the accommodation of the portable terminals in a closed area can make the dispenser of the invention more robust to electromagnetic interference noise by making the vertical body of metal. A shield against electromagnetic interference can indeed be created in this case.

Preferably, the air conditioning system comprises an air conditioning circuit extending within the storage area and passing through each compartment of said plurality of compartments. This makes more effective the advantageous effects discussed above with respect to the generation of a humidity and temperature controlled environment within the storage area.

Preferably, the air conditioning circuit is a closed circuit with full recycle of the air.

Preferably, the air conditioning circuit comprises at least one air filtration unit. This improves quality of the forced air circulating within the dispenser, with advantages to the wealth of the users who will handle the portable terminals housed therein.

In preferred embodiments of the invention, at least one sterilization station is arranged within said storage area. Thanks to the provision of a sterilization station complete removal of possible bacterium or contaminant from the portable terminals is ensured. Due to the fact that the portable terminals are housed in a closed area, UV lamps can be used without any risk of exposure to UV rays for the users. Static filtration and/or electrostatic filtration can be provided as well within the closed area housing the portable terminals to obtain or improve sterilization of the portable terminals.

In preferred embodiments of the invention, said storage area has a substantially cylindrical shape and said plurality of compartments are arranged on a plurality of superposed circular support members which are movable clockwise and/or anticlockwise. This layout has been identified by the Applicant as being the most appropriate for storing a massive quantity of portable terminals in an extremely compact area and for allowing easy access for the users to the portable terminals to be taken out.

Preferably, said support members are separately movable from each other. This provision allow direct access to different portable terminals for different users simultaneously in case more different access doors are provided.

Preferably, said air conditioning circuit comprises a central vertical hollow tube and said support members are coaxially connected to said vertical hollow tube and extend radially outwardly therefrom. The air conditioning circuit is thus advantageously integrated in the structure of the dispenser supporting the portable terminals.

Preferably, said vertical hollow tube comprises an inner channel and an outer channel connected to the inner channel for the passage of air from the inner channel to the outer channel, said support members being connected to the outer channel.

Preferably, said inner channel comprises an air inlet portion at the top thereof and an air exit portion at the bottom thereof and said outer channel is closed at the top portion thereof and is connected to the inner channel at the bottom portion thereof. A forced air flow from the top to the bottom within the inner tube and from the bottom to the top within the outer tube is achieved.

Alternatively, said inner channel comprises an air inlet portion at the bottom thereof and an air exit portion at the top thereof and said outer channel is closed at the bottom portion thereof and is connected to the inner channel at the top portion thereof. In this alternative case, the forced air flow is opposite to the one discussed above.

Preferably, the outer channel comprises an opening at each of said compartments for the passage of air from the outer channel to the compartments.

Preferably, each compartment of said plurality of compartment comprises a seat for housing a portable terminal of said plurality of portable terminals, wherein at least one hole is formed in the seat for the passage of air from the compartment to the seat. This allows the forced air to reach the portable terminals housed in the compartments and to provide for all the benefic effects discussed above.

In preferred embodiments of the invention, the dispenser comprises a first plurality of access doors angularly spaced apart from each other, wherein each doors is configured to be opened independently from the others. This allows to achieve a higher operation flexibility. Indeed, different users can simultaneously take different portable terminals at different positions around the dispenser.

Preferably, the dispenser comprises at least one second access door vertically spaced apart from a respective door of said plurality of access doors. This allows to achieve the maximum operation flexibility.

Preferably, the dispenser comprises at least one card reader for users authorization.

Advantageously, the card reader allows users to have access to the portable terminals only after having been successfully identified and authorised. Therefore, a safety mechanism at each compartment is not required, with clear benefits in terms of manufacturing complexity and costs.

Preferably, the dispenser comprises, at each compartment of said plurality of compartments, an ID code reader for identification of, and more preferably communication to and from, the portable terminals.

Advantageously, the ID code reader allows identification of the exact position of each portable terminal inside the dispenser and communication with the portable terminal in order to know for example the status of the battery and consequently decide whether the battery need to be charged or the portable terminal is ready to be taken by a new user.

Further characteristics and advantages of the automatic dispenser of the present invention will become clearer from the following detailed description of a preferred embodiment thereof, made purely as a non-limiting example with reference to the attached drawings. In such drawings.

In FIGS. 1 to 4, an automatic dispenser of portable terminals in accordance with a preferred embodiment of the present invention is indicated with numeral reference 10.

The dispenser 10 is intended to be used in a store or shopping centre to provide authorised users or customers with portable terminals in order to carry out self-shopping operations.

The dispenser 10 comprises a substantially vertical body 11.

In the specific example shown in the attached drawings, the vertical body 11 has a substantially cylindrical shape.

The vertical body 11 comprises a bottom portion 11a, an upper portion 11b and a cover element 12 arranged above the upper portion 11b to close the vertical body 11 at the top thereof.

Figure 4:
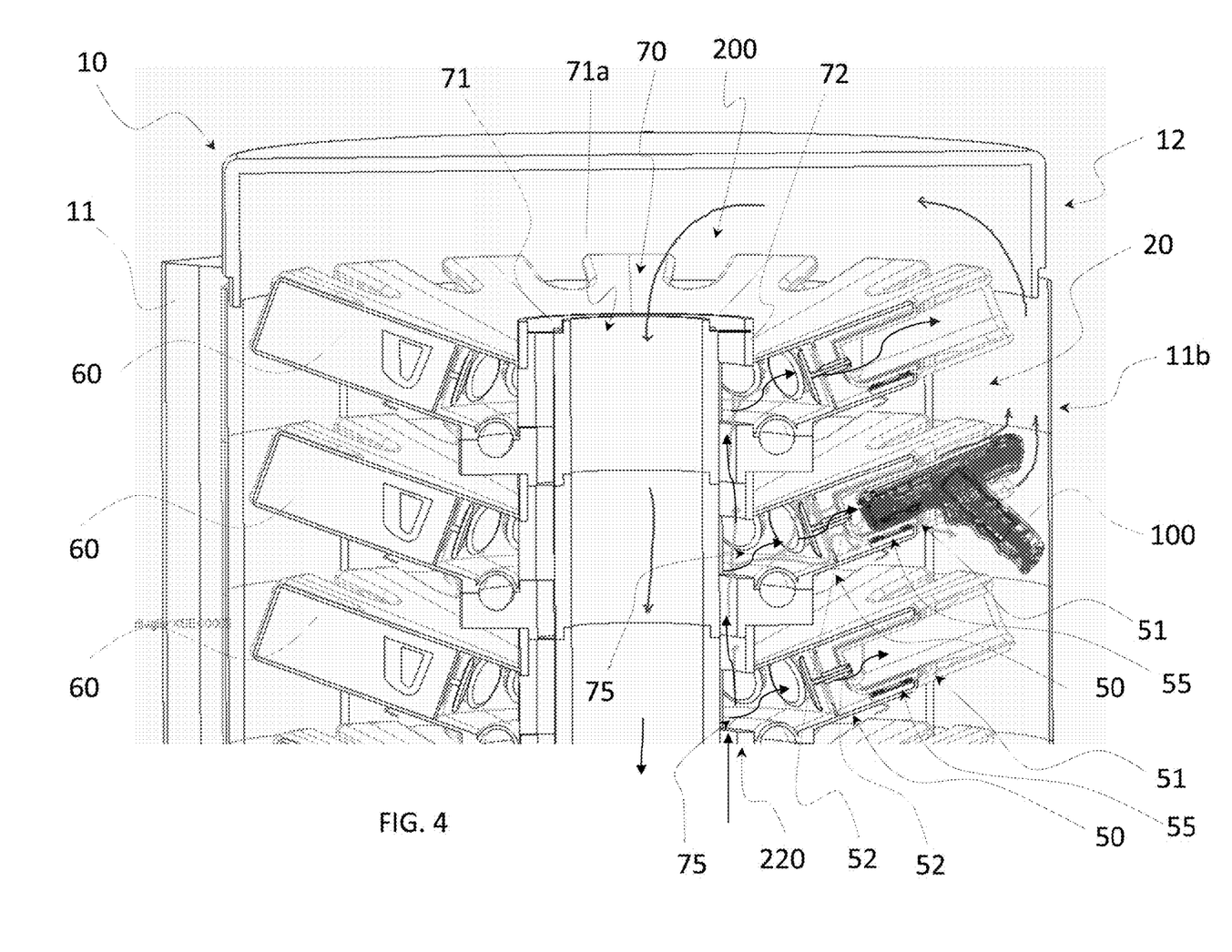
FIG. 4 is a schematic perspective view of a portion of the internal area of the dispenser of FIG. 1.

As shown in FIG. 4, the upper portion 11b defines in the vertical body 11a fully closed storage area 20.

A plurality of compartments 50 are provided within the storage area 20. For the sake of clarity, in FIG. 4 numeral reference 50 has been affixed to only some of the above-mentioned compartments.

Figure 2:
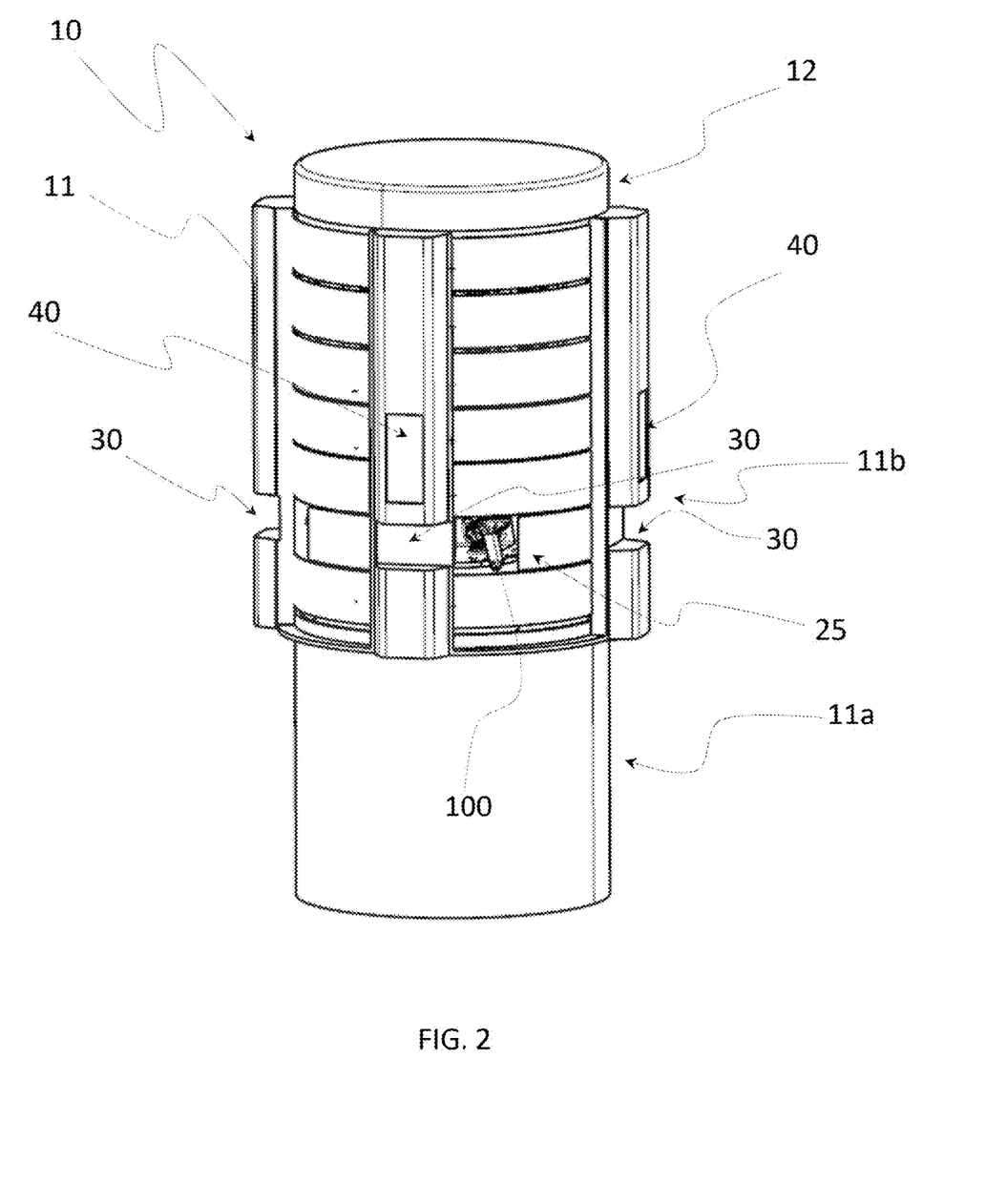
FIG. 2 is a schematic perspective view showing the dispenser of FIG. 1 in a different operative configuration thereof and from a slightly different point of observation.
Figure 3:
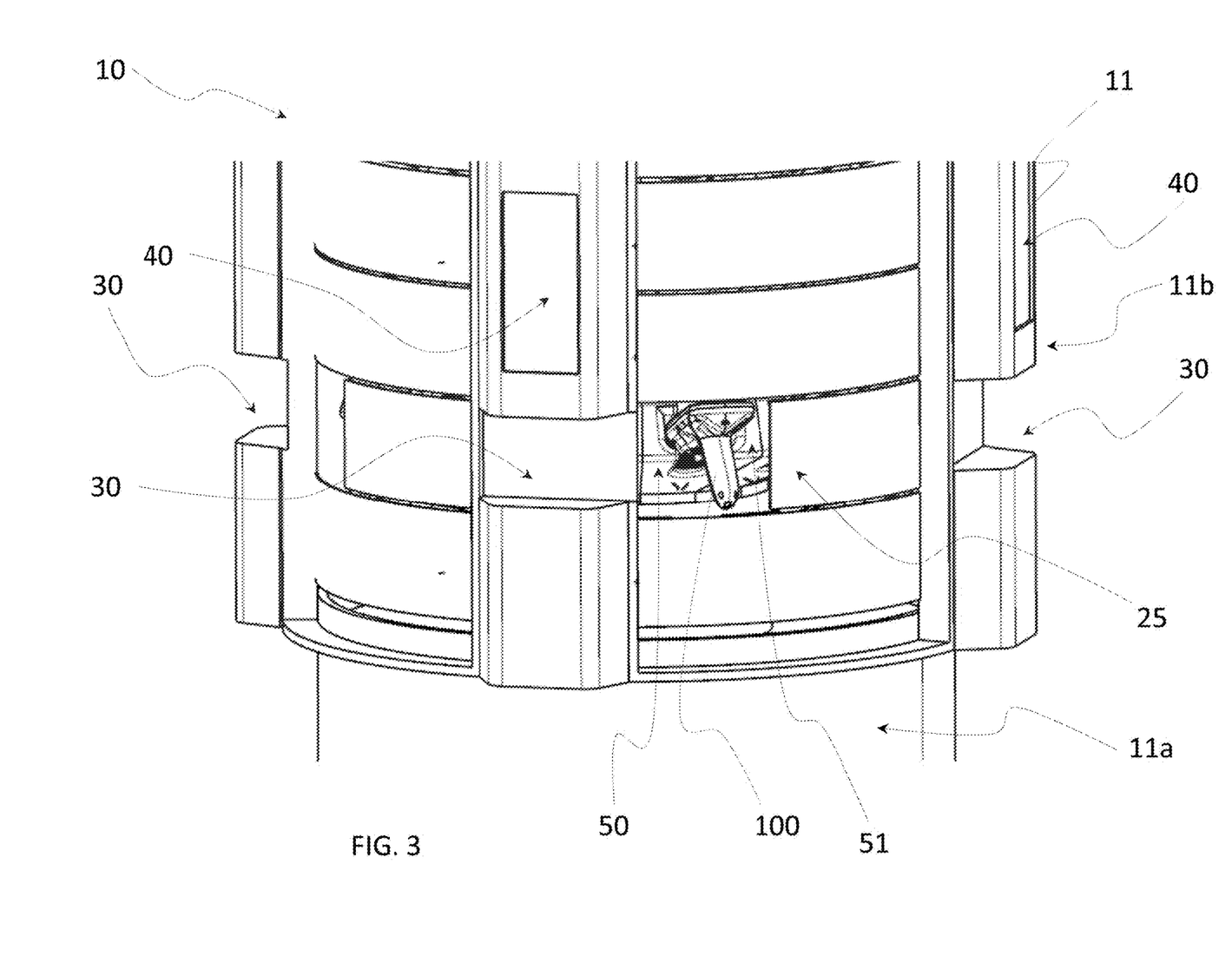
FIG. 3 is an enlarged view of a portion of FIG. 2.

Each compartment 50 is configured to house a corresponding portable terminal. FIGS. 2-4 show an example of a portable terminal, labeled with 100, housed in a compartment 50 of the dispenser 10.

The storage area 20 may be provided with a transparent outer surface enabling the internal area thereof to be observed from the outside. Alternatively, as in the example shown in FIGS. 1 to 3, the outer surface is opaque.

The upper portion 11b includes a plurality of access doors 25 allowing selective access of the users to the storage area 20. One of this access door 25 is shown in FIGS. 2 and 3 in the open position thereof.

In an embodiment not shown, the dispenser 10 comprises just one access door 25.

Figure 1:
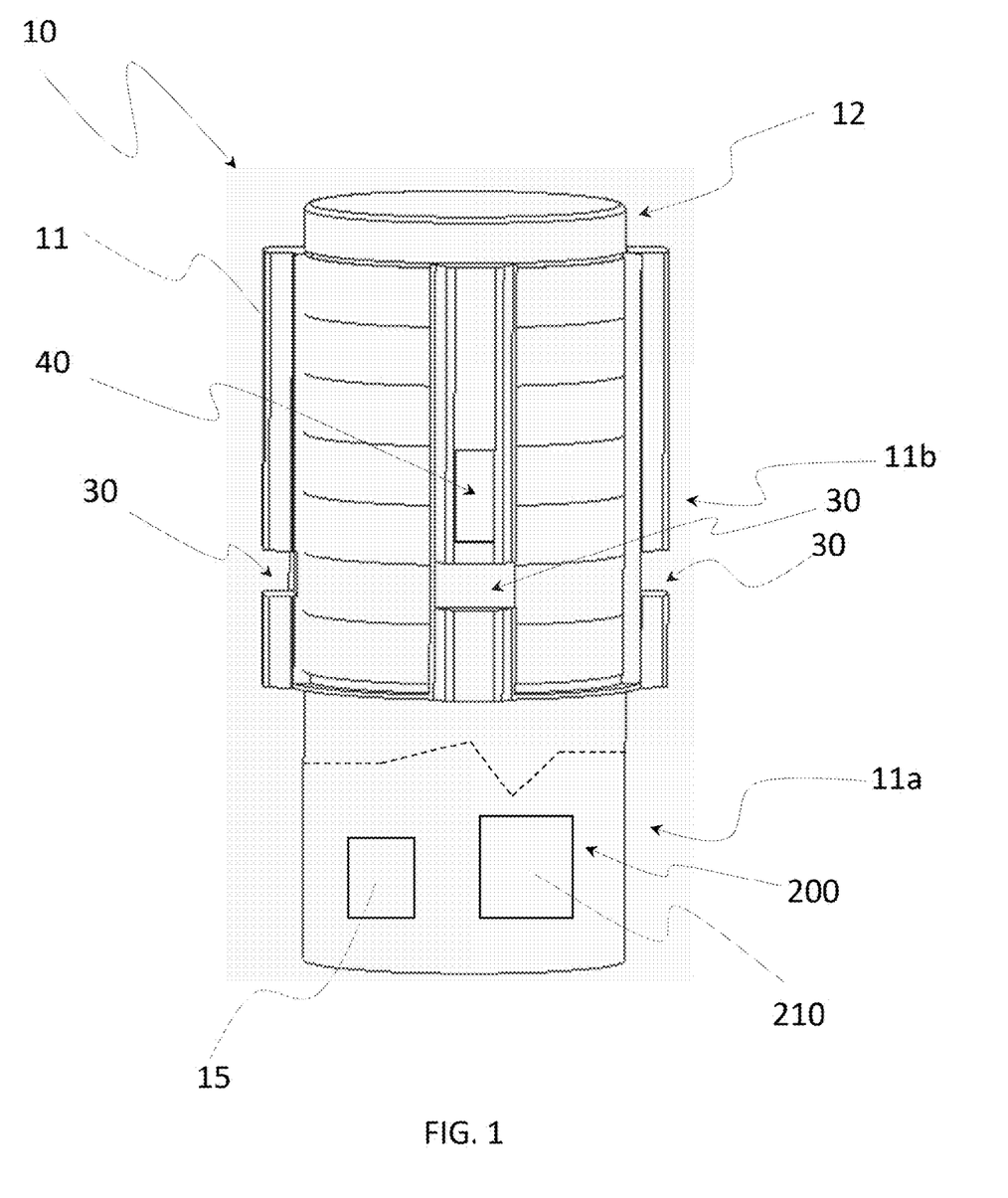
FIG. 1 is a schematic perspective and partially sectioned view of a preferred embodiment of the automatic dispenser of the invention.

The opening of the access doors 25 can occur automatically or manually by sliding, as shown for example in FIGS. 2 and 3, or by pivoting on hinges provided on the upper portion 11b. The opening of each access door 25 is controlled by a control unit 15 arranged within the vertical body 11, for example in the bottom portion 11a thereof, as shown in FIG. 1.

If more than one access door 25 is provided, the access doors 25 are configured to be opened independently from each other.

Preferably, the access doors 25 are angularly spaced apart from each other. For example, four access doors 25 can be provided, wherein each access door 25 is spaced apart of about 90° from another access door 25.

More preferably, further access doors may also be arranged in the upper portion 11b vertically spaced apart from each access door 25.

Preferably, the access doors 25 are configured to be closed during blackout or malfunctioning in order to prevent access within the storage area 20 in such a special circumstances. Alternatively, a backup battery can be provided in the dispenser 10 to keep the dispenser 10 fully operative even when the external power supply is missing.

As shown in FIGS. 1-3, the dispenser 10 further comprises, at the upper portion 11b, a plurality of card readers 30 for users identification.

Preferably, the card readers 30 read optical codes printed on fidelity cards own by the users so as to identify each user and assign a portable terminal 100 to him/her.

In an embodiment not shown, the dispenser 10 comprises just one card reader 30.

If more than one car reader 30 is provided, the card readers 30 are preferably angularly spaced apart from each. For example, as shown in FIGS. 1 to 3, four card readers 30 can be provided, wherein each card reader 30 is spaced apart of about 90° from another card reader 30.

Preferably, each card reader 30 is arranged adjacent to a respective access door 25 in order to reduce the time spent by the users to take the portable terminals 100 and to avoid the users to hunt for the portable device 100 which has been assigned to him/her.

The dispenser 10 further comprises, at the upper portion 11b, a plurality of displays 40.

For example, the displays 40 can provide the users with information about the fidelity card and/or with the amount to be paid and/or with advertising information.

Advertising information can be also provided to the user by affixing on the outer surface of the vertical body 11 advertising posters.

In an embodiment not shown, the dispenser 10 comprises just one display 40.

If more than one display 40 is provided, the displays 40 are preferably angularly spaced apart from each. For example, as shown in FIGS. 1 to 3, four displays 40 can be provided, wherein each display 40 is spaced apart of about 90° from another display 40.

Preferably, each display 40 is arranged above a respective card reader 30, as shown in FIGS. 1 to 3.

One or more keyboards (not shown) can be provided, each one being preferably arranged at, or close to, a respective card reader 30.

As better shown in FIG. 4, the compartments 50 are arranged on a plurality of superposed circular support members 60 which are preferably movable clockwise and/or anticlockwise. More preferably, each support members 60 rotates independently from the others. Alternatively, all the support members 60 can rotate together as a whole.

In case all the access doors 25 are provided at a same height, the support members 60 can move also vertically.

The compartments 50 of each support member 60 extend radially from a tube 70 extending vertically at the centre of the storage area 20.

In the example shown in the attached drawings, the tube 70 is hollow and comprises an inner channel 71 and an outer channel 72 arranged in a radially outer position with respect to, and coaxially to, the inner channel 71. The support members 60 are connected to the outer channel 72.

Each compartment 50 comprises a seat 51 for housing the portable terminal 100. Preferably, the seat 51 is U-shaped and is configured to allow accommodation of different versions of portable terminals 100, such as handheld versions or gun-shaped versions. For the sake of clarity, in FIG. 4 numeral reference 51 has been affixed to only some of the abovementioned seats.

A wireless charging unit 55 is arranged within each compartment 50 for charging/recharging the battery of the portable terminal 100 housed in the seat 51. For the sake of clarity, in FIG. 4 numeral reference 55 has been affixed to only some of the abovementioned charging units.

For example, each wireless charging unit 55 comprises one or more transmissive element (not shown), for example a TX coil, communicating with dedicated microcontroller (not shown) or with the central unit 15 or with a remote control station (not shown) and with a receiving element, for example a Rx coil, arranged within each portable terminals 100. Each transmissive element is able to detect the presence of a portable terminal 100 in the seat 51 and to start charging the battery of the portable terminal 100.

Preferably, an ID code reader (not show) is provided at each seat 51 for allowing identification of the portable terminals 100. More preferably, the ID code is an IP address or a different custom code associated to each portable terminal 100 and configured to allow communication with the portable terminal 100.

The dispenser 10 further comprises an air conditioning system 200 configured to control temperature and humidity of each compartment 50.

In the specific example herein described, the air conditioning system 200 comprises an air conditioning power station 210 arranged within the vertical body 11 (for example in the bottom portion 11a thereof, as shown in FIG. 1) and an air conditioning circuit 220 extending within said storage area 20 and passing through each compartment 50.

The air conditioning circuit 220 can be a closed circuit with full recycle of the air or an open circuit with full or partial integration of external air.

The air conditioning system is designed and controlled by the air conditioning power station 210 to provide within the storage area 20 a temperature preferably between 8° C. and 18° C. and a humidity preferably below 10%.

The air conditioning can be provided by an internal HVAC system or supplied by external water or air treated by external HVAC systems.

Preferably, the air conditioning circuit 220 further comprises one or more filtration units (shown) arranged within the storage area 20.

One or more sterilization stations (not shown) can be provided within the storage area 20 as well. The sterilization unit can comprise UV lamps. Alternatively or in addition to the UV lamps, sterilization can be obtained by static filtration or electrostatic filtration.

Preferably, the central tube 70 is part of the air conditioning circuit 200.

In the specific example shown in the attached drawings, and specifically in FIG. 4, the inner channel 71 comprises an air inlet portion 71a at the top thereof and an air exit portion (not shown) at the bottom thereof and the outer channel 72 is closed at the top portion thereof and is connected to the inner channel 71 at the bottom portion thereof so as to obtain an air flow within the inner channel 71 from the top to the bottom and an air flow in the outer channel 72 from the bottom to the top.

In order to allow the air flowing in the outer channel 72 from the inner channel 71 to pass through the compartments 50 and reach the portable terminals 100 housed in the seats 51, the outer channel 72 comprises an opening 75 at each compartment 50 for the passage of air from outer channel 72 to the compartment 50 and each seat 51 has at least one hole 52 for the passage of air from the compartment 50 to seat 51. For the sake of clarity, in FIG. 4 numeral references 75 and 52 have been affixed to only some of abovementioned openings and holes, respectively.

The path of the forced air flow is shown in FIG. 4 by appropriate arrows.

In a specific embodiment designed by the Applicant, seven support members 60 are provided, each support member 60 supporting fourteen compartments 50, so that ninety-eight compartments 50 are provided within the storage area 20.

In operation, the portable terminals 100 housed within the storage area 20 are kept at a temperature and humidity controlled condition in order to allow a quick and effective charging of the portable terminal battery as well as to avoid proliferation of undesired bacterium and contaminants onto the portable terminals 100. When an user is identified and authorized to take one of the abovementioned portable terminal 100 upon reading of his/her fidelity card by the card reader 30, the support member 60 which supports the compartment 50 wherein the portable terminal 100 assigned to the user is housed rotates to bring the portable terminal 100 in front of the access door 25 close to the card reader 30 where the user has been identified. The access door 25 automatically or manually opens and the user can take the portable terminal 100 and carry out a self-shopping operation.

Of course, a man skilled in the art can make further changes and modifications to above-described dispenser 10 in order to meet specific and contingent application requirements, these changes and modifications in any case falling within the scope of protection defined by the following claims.

The invention claimed is:

1. Automatic dispenser of portable terminals, comprising:
   a vertical body having a fully closed storage area including a plurality of compartments for storing a corresponding plurality of portable terminals to be taken by authorized users, wherein the plurality of compartments are arranged on a plurality of superposed circular support members which are independently movable clockwise and/or anticlockwise relative to each other;
   at least one access door arranged on the vertical body at the storage area and providing for a selective access within the storage area;
   a wireless charging unit including a wireless power transmitter coil arranged at each compartment of the plurality of compartments to correspond to a wireless power receiving coil in the portable terminal stored in the compartment;

an air conditioning system configured to control temperature and humidity of each compartment of the plurality of compartments within the storage area; and a user authorization device configured to authenticate a user, wherein the at least one superposed support member is configured to rotate to bring a portable terminal assigned to the authenticated user to an access door proximate the authorization device and enable the access door to be opened in response to authenticating the user.

2. The automatic dispenser of claim 1, wherein the air conditioning system comprises an air conditioning circuit extending within the storage area and passing through each compartment of the plurality of compartments.

3. The automatic dispenser of claim 2, wherein the air conditioning circuit is a closed circuit with full recycle of the air.

4. The automatic dispenser of claim 1, wherein the air conditioning system comprises at least one air filtration unit.

5. The automatic dispenser of claim 1, comprising at least one sterilization station arranged within the storage area and configured to perform sterilization of the portable terminals stored within the automatic dispenser.

6. The automatic dispenser of claim 1, wherein the storage area has a substantially cylindrical shape and the plurality of compartments are arranged on a plurality of superposed circular support members.

7. The automatic dispenser of claim 6, wherein the air conditioning system comprises an air conditioning circuit extending within the storage area and passing through each compartment of the plurality of compartments, and wherein the air conditioning circuit comprises a central vertical hollow tube and wherein the support members are coaxially connected to the vertical hollow tube and extend radially outwardly therefrom.

8. The automatic dispenser of claim 7, wherein the vertical hollow tube comprises an inner channel and an outer channel connected to the inner channel for the passage of air from the inner channel to the outer channel, wherein the support members are connected to the outer channel.

9. The automatic dispenser of claim 8, wherein the inner channel comprises an air inlet portion at the top thereof and an air exit portion at the bottom thereof and wherein the outer channel is closed at the top portion thereof and is connected to the inner channel at the bottom portion thereof.

10. The automatic dispenser of claim 8, wherein the outer channel comprises an opening at each compartment of the plurality of compartments for the passage of air from the outer channel to the compartment.

11. The automatic dispenser of claim 10, wherein each compartment of the plurality of compartment comprises a seat for housing a portable terminal of the plurality of portable terminals, wherein at least one hole is formed in the seat for the passage of air from the compartment to the seat.

12. The automatic dispenser of claim 6, comprising a first plurality of access doors angularly spaced apart from each other, wherein each door of the plurality is configured to be opened independently from the others.

13. The automatic dispenser of claim 12, comprising at least one second access door vertically spaced apart from a respective door of the first plurality of access doors.

14. The automatic dispenser of claim 1, wherein the at least one sterilization station is configured to perform sterilization of the portable terminals within the automatic dispenser via at least one of UV radiation, static filtration, electrostatic filtration.

15. The automatic dispenser of claim 1, wherein each wireless charging unit is configured to detect a presence of a portable terminal being placed within the corresponding compartment and initiate wireless power charging in response thereto.

16. An automatic dispenser of portable data terminals, comprising:

a vertical body having a fully closed storage area including a plurality of compartments for storing a corresponding plurality of portable terminals to be taken by authorized users, wherein the plurality of compartments are arranged on a plurality of superposed support members which are independently movable clockwise and/or anticlockwise relative to each other;

at least one access door arranged on the vertical body at the storage area and providing for a selective access within the storage area;

a wireless charging unit including a wireless power transmitter coil arranged at each compartment of the plurality of compartments to correspond to a wireless power receiving coil in the portable terminal stored in the compartment; and a user authorization device configured to authenticate a user, wherein the at least one superposed circular support member is configured to rotate to bring a portable terminal assigned to the authenticated user to an access door proximate the authorization device and enable the access door to be opened in response to authenticating the user.

17. The automatic dispenser of claim 16, comprising at least one card reader configured to read a fidelity card associated with the user.

18. The automatic dispenser of claim 16, further comprising at least one additional user authorization device configured to authenticate a user, wherein the user authorization device and the at least one additional user authorization device are spaced apart from each other and disposed adjacent to a corresponding access door for the support members to bring the portable terminal to depending on which user authorization device was used to authenticate the user.

19. The automatic dispenser of claim 18, wherein the circular support members configured to be operable simultaneously to bring different portable terminals to different access doors if multiple user authorization devices authenticate activate the automatic dispenser at overlapping intervals.

20. The automatic dispenser of claim 16, further comprising an ID code reader at each compartment of the plurality of compartments and configured to for identification of, and communication to and from, the portable terminals.

* * * * *